United States Patent
Hunukumbure et al.

(10) Patent No.: US 8,676,218 B2
(45) Date of Patent: Mar. 18, 2014

(54) COVERAGE HOLE COMPENSATION IN A CELLULAR WIRELESS NETWORK

(75) Inventors: Mythri Hunukumbure, Hillingdon (GB); Sunil Keshavji Vadgama, Ashford Middlesex (GB)

(73) Assignee: Fujitsu Limited, Kawasaki (JP)

(*) Notice: Subject to any disclaimer, the term of this patent is extended or adjusted under 35 U.S.C. 154(b) by 48 days.

(21) Appl. No.: 13/348,099

(22) Filed: Jan. 11, 2012

(65) Prior Publication Data

US 2012/0184280 A1 Jul. 19, 2012

(30) Foreign Application Priority Data

Jan. 14, 2011 (GB) .................................. 1100599.8

(51) Int. Cl.
*H04W 24/00* (2009.01)
*H04W 40/00* (2009.01)

(52) U.S. Cl.
USPC ............ 455/446; 455/423; 370/328; 370/216

(58) Field of Classification Search
USPC .......... 455/423, 424, 446–448; 370/216, 328, 370/338
See application file for complete search history.

(56) References Cited

U.S. PATENT DOCUMENTS

| | | | | |
|---|---|---|---|---|
| 5,852,778 A | * | 12/1998 | Labedz ......................... | 455/423 |
| 5,878,328 A | * | 3/1999 | Chawla et al. ............. | 455/67.11 |
| 2006/0126556 A1 | * | 6/2006 | Jiang et al. ................... | 370/328 |
| 2008/0062942 A1 | * | 3/2008 | Hills et al. .................... | 370/338 |
| 2009/0042596 A1 | * | 2/2009 | Yavuz et al. ................. | 455/522 |
| 2010/0216453 A1 | | 8/2010 | Kallin et al. | |
| 2010/0278038 A1 | * | 11/2010 | Stahle et al. ................. | 370/216 |
| 2011/0212720 A1 | | 9/2011 | Hamalainen et al. | |
| 2012/0184280 A1 | * | 7/2012 | Hunukumbure et al. ..... | 455/446 |

FOREIGN PATENT DOCUMENTS

| | | |
|---|---|---|
| EP | 2 154 918 | 2/2010 |
| JP | 2002-112323 | 4/2002 |
| JP | 2007-228481 | 9/2007 |
| WO | 2009/078764 | 6/2009 |
| WO | 2010/051838 | 5/2010 |

OTHER PUBLICATIONS

Great Britain Search Report dated May 9, 2011, from corresponding GB Application No. 1100599.8.
Notice of Reasons for Rejection dated Aug. 20, 2013, from corresponding Japanese Application No. 2012-004319.

* cited by examiner

*Primary Examiner* — Lester Kincaid
*Assistant Examiner* — Daniel Lai
(74) *Attorney, Agent, or Firm* — Katten Muchin Rosenman LLP

(57) ABSTRACT

A method for use in providing coverage for at least part of a coverage hole in a first cell or cell sector in a cellular wireless network, in which method a second cell or cell sector is selected, from a group of cells or cell sectors in the cellular wireless network which neighbor the first cell or cell sector, to adapt its coverage so as to cover at least part of the coverage hole in the first cell or cell sector, the method including carrying out an identification process using data relating to a cell or cell sector in the group to identify a cell or cell sector suitable for selection as the second cell or cell sector, the identification process being carried out on one or more cells or cell sectors in the group in turn.

24 Claims, 6 Drawing Sheets

COVERAGE HOLE COMPENSATION IN A CELLULAR WIRELESS NETWORK

The present invention relates to coverage hole compensation in a cellular wireless network.

Coverage holes are caused when the serving cell/sector cannot provide coverage to a specific region/point within its coverage area. These coverage holes can be compensated by extending the coverage of one adjacent cell/sector. Expanding the coverage of cell(s)/sector(s) to compensate for a coverage hole in an adjacent cell/sector is an expected feature in Self Organized Networks (SON), but is also desirable in other forms of cellular wireless network. When base station antennas are originally set up they can be configured such that transmit power is less than the maximum power achievable, for example by 3-6 dB, and such that antenna down-tilt is incremented additionally by, say, 2° to 4°. This enables the transmit power and tilt of the base station to be changed if and when coverage hole compensation is required. Thus, the current methodology for coverage compensation is to visualize the coverage failure in a network optimizing map and iteratively change the parameters of base station (eNodeB) antenna down-tilt, bore-sight angle of the azimuth radiation pattern and the amplifier transmit power of adjacent cells/sectors until an optimal solution is found using network planning software. These iterations are conducted over the full range of permissible values and can take up considerable computational effort and time, particularly when several base station (eNodeBs) are involved.

Accordingly it is desirable to provide an improved method for use in providing coverage for a coverage hole.

According to an embodiment of a first aspect of the present invention there is provided a method for use in providing coverage for at least part of a coverage hole in a first cell or cell sector of a cellular wireless network, in which method a second cell or cell sector is selected, from a group of cells or cell sectors of the cellular wireless network which neighbour the first cell or cell sector, to adapt its coverage so as to cover at least part of the coverage hole in the first cell or cell sector, the method comprising: carrying out an identification process using data relating to a cell or cell sector in the said group to identify a cell or cell sector suitable for selection as the said second cell or cell sector, the identification process being carried out on one or more cells or cell sectors in the said group in turn, wherein the identification process comprises: finding a cell or cell sector in the group which fulfils a predetermined criterion indicative of actual or probable signal strength of a signal from the cell or cell sector at the said coverage hole; and determining whether a first transmission parameter setting for the cell or cell sector found to fulfil the predetermined criterion can be adjusted such that the cell or cell sector can provide coverage for at least part of the coverage hole in the first cell or cell sector, and, if so, identifying the cell or cell sector as a cell or cell sector suitable for selection as the said second cell.

In a first embodiment of the method, where the transmission data readings for the cells or cell sectors in the said group are reliable, preferably the said predetermined criterion is highest strength of signal from the cell or cell sector at the coverage hole, and the cells or cell sectors in the group are considered in descending order of signal strength.

In the first embodiment, if the first transmission parameter setting for the cell or cell sector cannot be adjusted such that the cell or cell sector can provide coverage for at least part of the coverage hole, the identification process may further comprise: determining whether a second transmission parameter setting for the cell or cell sector can be adjusted such that the cell or cell sector can provide coverage for at least part of the coverage hole in the first cell or cell sector, and, if so, identifying the cell or cell sector as a cell or cell sector suitable for selection as the said second cell.

If the second transmission parameter setting for the cell or cell sector cannot be adjusted such that the cell or cell sector can provide coverage for at least part of the coverage hole, the identification process may further comprise: determining whether a third transmission parameter setting for the cell or cell sector can be adjusted such that the cell or cell sector can provide coverage for at least part of the coverage hole in the first cell or cell sector, and, if so, identifying the cell or cell sector as a cell or cell sector suitable for selection as the said second cell.

If the first transmission parameter setting, or the first and second transmission parameter settings in combination, or the first, second and third transmission parameter settings in combination, as the case may be, for the cell or cell sector cannot be adjusted such that the cell or cell sector can provide coverage for at least part of the coverage hole, the identification process is preferably repeated using cells or cell sectors in the group which have not yet been considered.

A method according to the first embodiment may further comprise, after selection of the second cell or cell sector, causing the first transmission parameter setting, or the first and second transmission parameter settings, or the first, second and third transmission parameter settings, as the case may be, for the selected second cell or cell sector to be adjusted appropriately.

In a second embodiment of the method, where the transmission data readings for the cells or cell sectors in the said group are not reliable, then preferably the cells or cell sectors in the said group are considered in descending order of proximity to the coverage hole until a cell or cell sector which fulfils the predetermined criterion is found, or until all the cells or cell sectors have been considered, the predetermined criterion being whether the maximum distance d at which the cell or cell sector can achieve a desired signal strength at the current transmission parameter settings of that cell or cell sector is greater than the distance $d_t$ between the coverage hole and that cell or cell sector.

In the second embodiment, if the first transmission parameter setting for the cell or cell sector found to fulfil the predetermined criterion cannot be adjusted such that the cell or cell sector can provide coverage for at least part of the coverage hole, the identification process is preferably repeated using cells or cell sectors in the group which have not yet been considered.

In the second embodiment, if none of the cells or cells sectors in the said group is found to fulfil the said predetermined criterion, the method may further comprise: finding the cell or cell sector in the said group for which the ratio $d_t/d$ is a minimum and selecting that cell or cell sector as the said second cell or cell sector.

After selection of the second cell or cell sector for which the ratio $d_t/d$ is a minimum, the method may further comprise determining whether the first transmission parameter setting and a second transmission parameter setting for the selected second cell or cell sector in combination can be adjusted such that the said second cell or cell sector can provide coverage for at least part of the coverage hole in the first cell or cell sector, and, if so, causing the first and second transmission parameter settings for the selected second cell or cell sector to be adjusted appropriately.

If adjustment of the first and second transmission parameter settings for the selected second cell or cell sector is not sufficient for the selected cell or cell sector to provide coverage for at least part of the coverage hole, the method may further comprise determining whether the first and second transmission parameter settings and a third transmission parameter setting in combination can be adjusted to a desired setting for that parameter which is such that the said second cell or cell sector can provide coverage for at least part of the coverage hole in the first cell or cell sector, and, if so, causing the first, second and third transmission parameter settings for the selected second cell or cell sector to be adjusted appropriately.

According to an embodiment of a second aspect of the present invention there is provided apparatus for use in a cellular wireless network, which apparatus is operable to assist in providing coverage for at least part of a coverage hole in a first cell or cell sector of the cellular wireless network by selecting a second cell or cell sector, from a group of cells or cell sectors of the cellular wireless network which neighbour the first cell or cell sector, to adapt its coverage so as to cover at least part of the coverage hole in the first cell or cell sector, the apparatus comprising: identification means configured to carry out an identification process using data relating to a cell or cell sector in the said group to identify a cell or cell sector suitable for selection as the said second cell or cell sector, the identification means being operable to carry out an identification process on one or more cells or cell sectors in the said group in turn, wherein the identification process comprises: finding a cell or cell sector in the group which fulfils a predetermined criterion indicative of actual or probable signal strength of a signal from the cell or cell sector at the said coverage hole; and determining whether a first transmission parameter setting for the cell or cell sector found to fulfil the predetermined criterion can be adjusted such that the cell or cell sector can provide coverage for at least part of the coverage hole in the first cell or cell sector, and, if so, identifying the cell or cell sector as a cell or cell sector suitable for selection as the said second cell.

In a first embodiment of the apparatus, where the transmission data readings for the cells or cell sectors in the said group are reliable, then preferably the said predetermined criterion is highest strength of signal from the cell or cell sector at the coverage hole, and the identification means are operable to consider the cells or cell sectors in the group in descending order of signal strength.

In the first embodiment of the apparatus, if the identification means determines that the first transmission parameter setting for the cell or cell sector cannot be adjusted such that the cell or cell sector can provide coverage for at least part of the coverage hole, the identification process carried out by the identification means may further comprise: determining whether a second transmission parameter setting for the cell or cell sector can be adjusted such that the cell or cell sector can provide coverage for at least part of the coverage hole in the first cell or cell sector, and, if so, identifying the cell or cell sector as a cell or cell sector suitable for selection as the said second cell.

If the identification means determine that the second transmission parameter setting for the cell or cell sector cannot be adjusted such that the cell or cell sector can provide coverage for at least part of the coverage hole, the identification process carried out by the identification means may further comprise: determining whether a third transmission parameter setting for the cell or cell sector can be adjusted such that the cell or cell sector can provide coverage for at least part of the coverage hole in the first cell or cell sector, and, if so, identifying the cell or cell sector as a cell or cell sector suitable for selection as the said second cell.

If the identification means determine that the first transmission parameter setting, or the first and second transmission parameter settings in combination, or the first, second and third transmission parameter settings in combination, as the case may be, for the cell or cell sector cannot be adjusted such that the cell or cell sector can provide coverage for at least part of the coverage hole, the identification means is preferably operable to repeat the identification process using cells or cell sectors in the group which have not yet been considered.

After selection of the second cell or cell sector, the apparatus may be operable to cause the first transmission parameter setting, or the first and second transmission parameter settings, or the first, second and third transmission parameter settings, as the case may be, for the selected second cell or cell sector to be adjusted appropriately.

In a second embodiment of the apparatus, where the transmission data readings for the cells or cell sectors in the said group are not reliable, then the identification means are preferably operable to consider the cells or cell sectors in the said group in descending order of proximity to the coverage hole until a cell or cell sector which fulfils the predetermined criterion is found, or until all the cells or cell sectors have been considered, the predetermined criterion being whether the maximum distance d at which the cell or cell sector can achieve a desired signal strength at the current transmission parameter settings of that cell or cell sector is greater than the distance $d_t$ between the coverage hole and that cell or cell sector.

In the second embodiment of the apparatus, if the identification means determine that the first transmission parameter setting for the cell or cell sector found to fulfil the predetermined criterion cannot be adjusted such that the cell or cell sector can provide coverage for at least part of the coverage hole, the identification means may be operable to repeat the identification process using cells or cell sectors in the group which have not yet been considered.

If none of the cells or cells sectors in the said group is found to fulfil the said predetermined criterion, the apparatus may be operable to find the cell or cell sector in the said group for which the ratio $d_t/d$ is a minimum and to select that cell or cell sector as the said second cell or cell sector.

After selection of the second cell or cell sector for which the ratio $d_t/d$ is a minimum, the apparatus is preferably operable to determine whether the first transmission parameter setting and a second transmission parameter setting for the selected second cell or cell sector in combination can be adjusted such that the said second cell or cell sector can provide coverage for at least part of the coverage hole in the first cell or cell sector, and, if so, to cause the first and second transmission parameter settings for the selected second cell or cell sector to be adjusted appropriately.

If adjustment of the first and second transmission parameter settings for the selected second cell or cell sector is not sufficient for the selected cell or cell sector to provide coverage for at least part of the coverage hole, the apparatus may be operable to determine whether the first and second transmission parameter settings and a third transmission parameter setting in combination can be adjusted such that the said second cell or cell sector can provide coverage for at least part of the coverage hole in the first cell or cell sector, and, if so, to cause the first, second and third transmission parameter settings for the selected second cell or cell sector to be adjusted appropriately.

In a method or apparatus embodying the present invention, the said first transmission parameter setting may be antenna down-tilt.

In a method or apparatus embodying the present invention, the said second transmission parameter setting may be antenna transmit power.

In a method or apparatus embodying the present invention, the said third transmission parameter setting may be azimuth angle to the bore-sight of the antenna radiation pattern.

According to an embodiment of a third aspect of the present invention there is provided a computer program which, when run on a computer, causes that computer to carry out a method embodying the first aspect of the present invention or to become apparatus embodying the second aspect of the present invention.

A method, apparatus or computer program embodying the present invention can significantly reduce the computational effort and time required to select the most appropriate cell/sector for coverage hole compensation and provide initial values for transmission parameters of the selected cell/sector without involving extensive calculation. In particular, unlike the conventional method, where iterations are conducted over the full range of permissible values for all base stations (eNodeBs) involved, it is only necessary to carry out the identification process of the present invention on one candidate cell at a time, and only to consider the next candidate cell in the group if the cell(s)/sector(s) already considered cannot be selected as the second cell/sector. Fine tuning the solution can be achieved by a few iterations around the initial transmission parameter values. For example, the coverage hole compensation provided by the initial transmission parameter values selected can be tested on a planning tool and if necessary one or more of the parameter settings can be adjusted further (tuned) until satisfactory coverage is achieved. Further tuning of the parameter settings can be carried out when the solution is applied in the actual network, based on new measurement reports sent by mobile users in the region where the coverage hole previously existed.

Reference will now be made, by way of example, to the accompanying drawings, in which.

Figure 1:
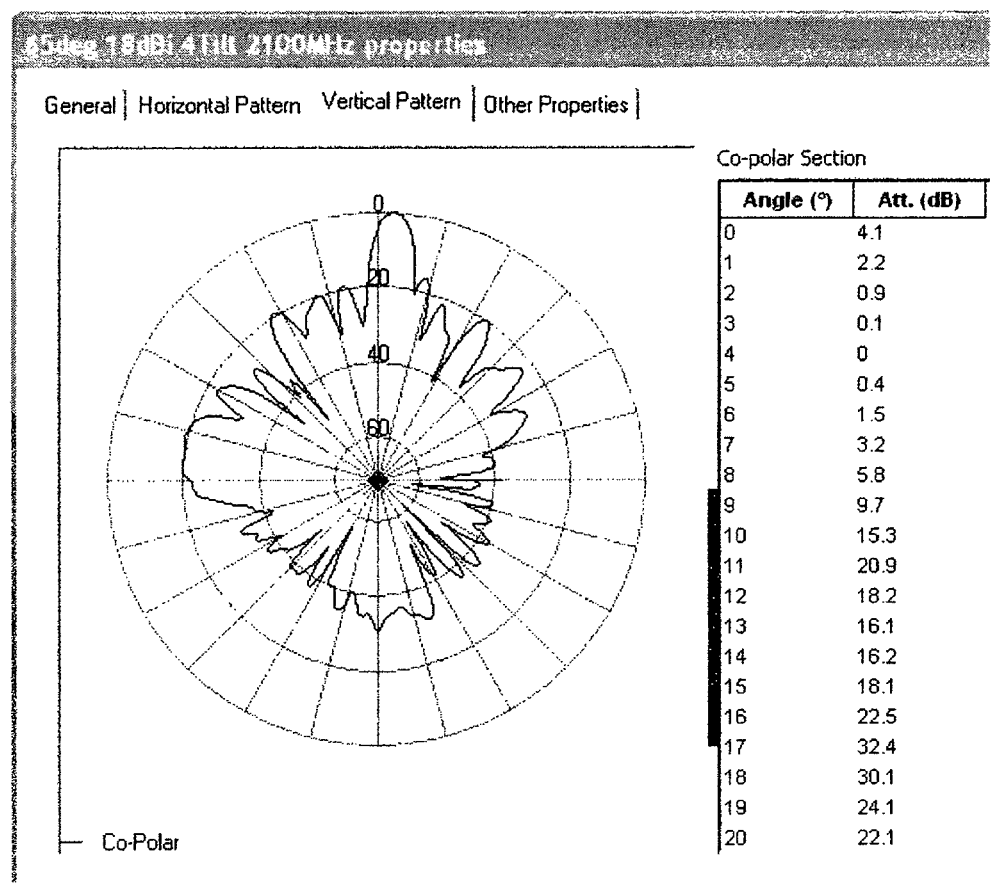
FIG. 1 is an example of a vertical radiation pattern of a commercial base station antenna.

In a method embodying the present invention, in order to cover a coverage hole in a first cell or cell sector, a second cell or cell sector is selected, from a group of cells or cell sectors of the cellular wireless network which neighbour the first cell or cell sector, to adapt its coverage so as to cover at least part of the coverage hole in the first cell or cell sector. An identification process is carried out using data relating to a cell or cell sector in the said group to identify a cell or cell sector suitable for selection as the said second cell or cell sector. Unlike the conventional method, where iterations are conducted over the full range of permissible values for all eNodeBs involved, the identification process of the present invention is carried out on one or more cells or cell sectors in the said group in turn. The identification process comprises finding a cell or cell sector in the group which fulfils a predetermined criterion indicative of actual or probable signal strength of a signal from the cell or cell sector at the said coverage hole, determining whether a first transmission parameter setting for the cell or cell sector found to fulfil the predetermined criterion can be adjusted such that the cell or cell sector can provide coverage for at least part of the coverage hole in the first cell or cell sector, and, if so, identifying the cell or cell sector as a cell or cell sector suitable for selection as the said second cell.

The steps of the identification process depend upon whether transmission data readings at the coverage hole from the cells neighbouring the first cell/sector are reliable. Reliability of the readings may be determined in various ways. For example, the signal level readings may be considered reliable if they are above a certain threshold, to be certain that they are not within the noise floor. In addition, readings may be considered reliable if multiple readings from different mobile users from the same coverage hole are within a limited range of values, indicating that multiple users are providing broadly the same readings.

In a first embodiment of the present invention, if there are reliable signal strength values of neighbouring cells available at the coverage hole location, then the identification process finds which of the neighbouring cells fulfils the predetermined criterion of providing the strongest signal at the coverage hole (i.e. a predetermined criterion indicative of actual signal strength). The signal strength values used must be reliable as these are weak signals and should be time averaged values.

The identification process then determines whether a first transmission parameter setting for the cell or cell sector found to fulfil the predetermined criterion can be adjusted such that the cell or cell sector can provide coverage for at least part of the coverage hole in the first cell or cell sector. If so, the cell or cell sector is identified as a cell or cell sector suitable for selection as the said second cell. An example of how the first transmission parameter setting can be adjusted will now be described.

In this example, the first parameter to be considered for adjustment is the antenna down-tilt. The antenna down-tilt is related to the vertical radiation pattern (on the elevation plane) of the antenna. Usually this pattern has a very narrow main beam, so that the radiated power beyond the cusp falls off sharply. This helps to reduce the interference power to the adjacent cells. A typical antenna radiation pattern on the vertical plane is shown in FIG. 1.

As seen in FIG. 1, some antennas have an inherent down-tilt in the radiation pattern as well (in this case 4°). This has to be considered when calculating the down-tilt adjustment. Using the strongest neighbour cell signal, the required down-tilt angle $\epsilon$ to the mobile user (in the coverage hole) to attain sufficient coverage is estimated.

Figure 2:
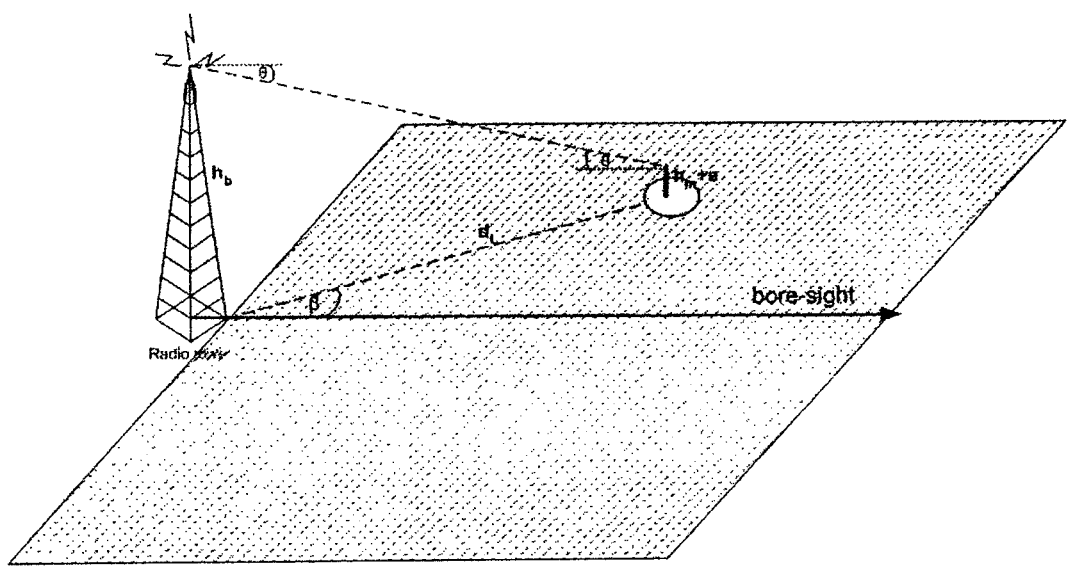
FIG. 2 illustrates a coverage hole with possible coverage extension of an adjacent cell/sector.

FIG. 2 illustrates a coverage hole with possible coverage extension of an adjacent cell/sector. As shown in FIG. 2, the angle $\theta$ is the angle of the signal path to the coverage hole. It is calculated as below:

$$\theta = \tan^{-1}((h_b - h_m - e)/d_t) \quad (1)$$

$h_b$ and $h_m$ denote the eNodeB and mobile station antenna heights while e is the difference in elevation from the mobile to the eNodeB. $d_t$ denotes the distance to the coverage hole. The difference in elevation term e should be calculated as follows:

$$e = \text{elevation at the mobile location} - \text{elevation at base station location} \quad (2)$$

Assume the current angle for the cusp of the main beam for this antenna to be η. This includes the down-tilt and any inherent tilt in the radiation pattern (as in FIG. 1). In the current settings, the signal ray to the coverage hole takes an angle of (η−θ) on the vertical radiation pattern. The signal attenuation towards the coverage hole, at this current setting, should be calculated.

At this stage the required signal strength improvement Δ should be considered. This is the improvement over the measured signal strength which is required in order to provide sufficient coverage from the neighbour cell. From the vertical pattern attenuation table (FIG. 1) it is possible to ascertain if this signal improvement Δ can be achieved by re-aligning the cusp of the main beam towards angle θ. If this is so, the adjustment of the antenna pattern to meet the Δ increment will give the new main beam angle ε for the selected cell/sector for coverage hole compensation.

$$D(\eta-\theta)-D(\epsilon-\theta)=\Delta \tag{3}$$

The operator D( ) denotes the attenuation of the signal (from the table in FIG. 1) for that specific angle. If the antenna pattern contains an inherent down-tilt of α°, the required down-tilt will be given by:

$$\text{Down-tilt}=\epsilon-\alpha \tag{4}$$

If the required signal improvement Δ is greater than that which can be achieved by adjustment of the first parameter setting, i.e. the antenna tilt, alone, in this embodiment the identification process determines whether a second transmission parameter setting for the cell or cell sector can also be adjusted such that the cell or cell sector can provide coverage for at least part of the coverage hole in the first cell or cell sector. If so, the cell or cell sector as a cell or cell sector suitable for selection as the said second cell is selected.

In this example, the second parameter to be considered for adjustment is transmit power. If the increment is within the capabilities of the base station (eNodeB), for example 3-6 dB as mentioned above, the transmit power of the base station can be adapted together with the antenna down-tilt so as to allow the cell/sector to provide cover for the coverage hole. Thus the initial parameter settings for the selected cell/sector are the down-tilt adjustment angle and the required increment in transmit power.

If adjustment of both the first and second transmission parameter settings is not sufficient to meet the required signal level at the coverage hole, in this embodiment the identification process further comprises determining whether a third transmission parameter setting for the cell or cell sector can also be adjusted such that the cell or cell sector can provide coverage for at least part of the coverage hole in the first cell or cell sector. If so, the cell or cell sector is identified as a cell or cell sector suitable for selection as the said second cell.

Figure 3:
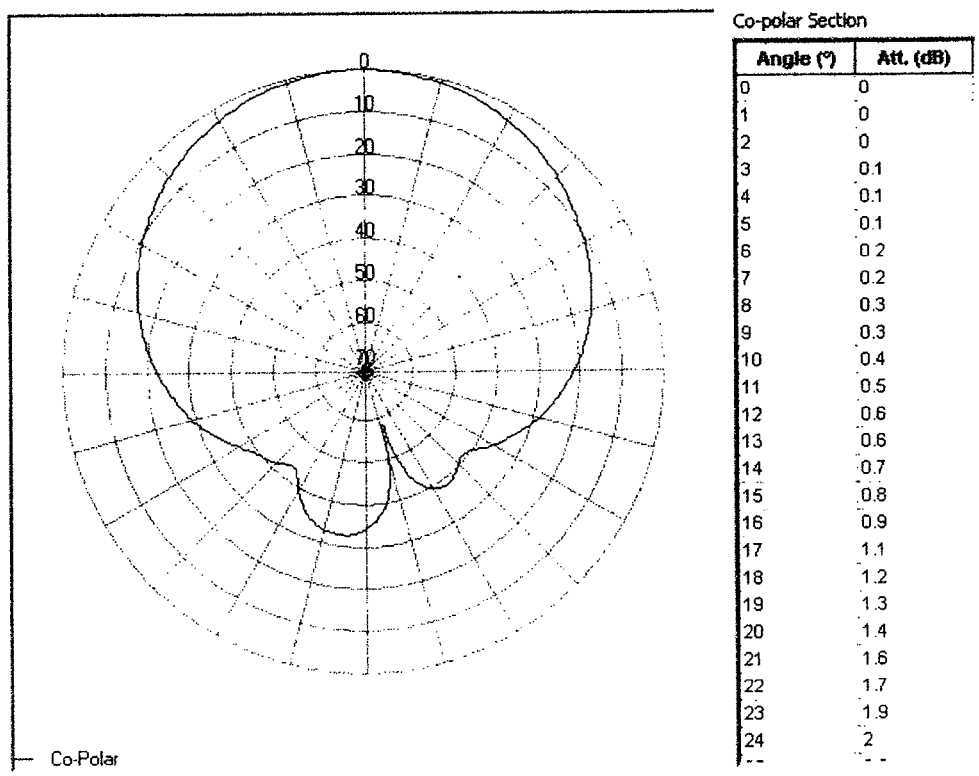
FIG. 3 is an example of a horizontal radiation pattern of a commercial base station antenna.

In this example, the third transmission parameter setting is the bore-sight angle of the azimuth radiation pattern. As seen in FIG. 3, which shows an example of a horizontal radiation pattern of a commercial base station antenna, the azimuth pattern degrades slowly for angle increments below 45°, while it degrades rapidly above 45°. From 45° to 60° (60° is the maximum spread of radiation pattern for a 3—sectored layout) there is around 5 dB gain difference. So if the additional required gain is within 5 dB and the azimuth angle β is within the range 45° to 60°, changing the bore-sight angle can be considered. The bore-sight angle should be changed by the relevant angle to achieve the additional required gain. If this is a 3-sectored layout, the bore-sight angle of the other two sectors should also be changed by the same angle so that the whole 3 sector pattern is rotated. Thus, in this case, the initial parameter settings include the changes to antenna tilt, transmit power and azimuth bore-sight direction.

If the required extended coverage for the coverage hole cannot be obtained by changing the settings of the first, second and third transmission parameters of the neighbouring cell/sector with the strongest signal strength, in a method embodying the first aspect of the present invention the identification process is then carried out with respect to the next strongest neighbouring cell/sector with reliable signal strength measurement values, and so on until the necessary parameter settings for coverage hole compensation are achieved or the list of neighbouring cells/sectors with reliable measurements is exhausted.

When suitable parameter settings are found to extend the coverage of a neighbouring cell/sector to compensate for the coverage hole, there may be some neighbouring cells/sectors which will be impacted by this extended coverage. The coverage of such neighbouring cells/sectors should be retracted to avoid interference. The basic settings for retracting the coverage should be calculated. These will consist of increased down-tilt, reduced transmit power and changes in the azimuth direction.

Figure 4:
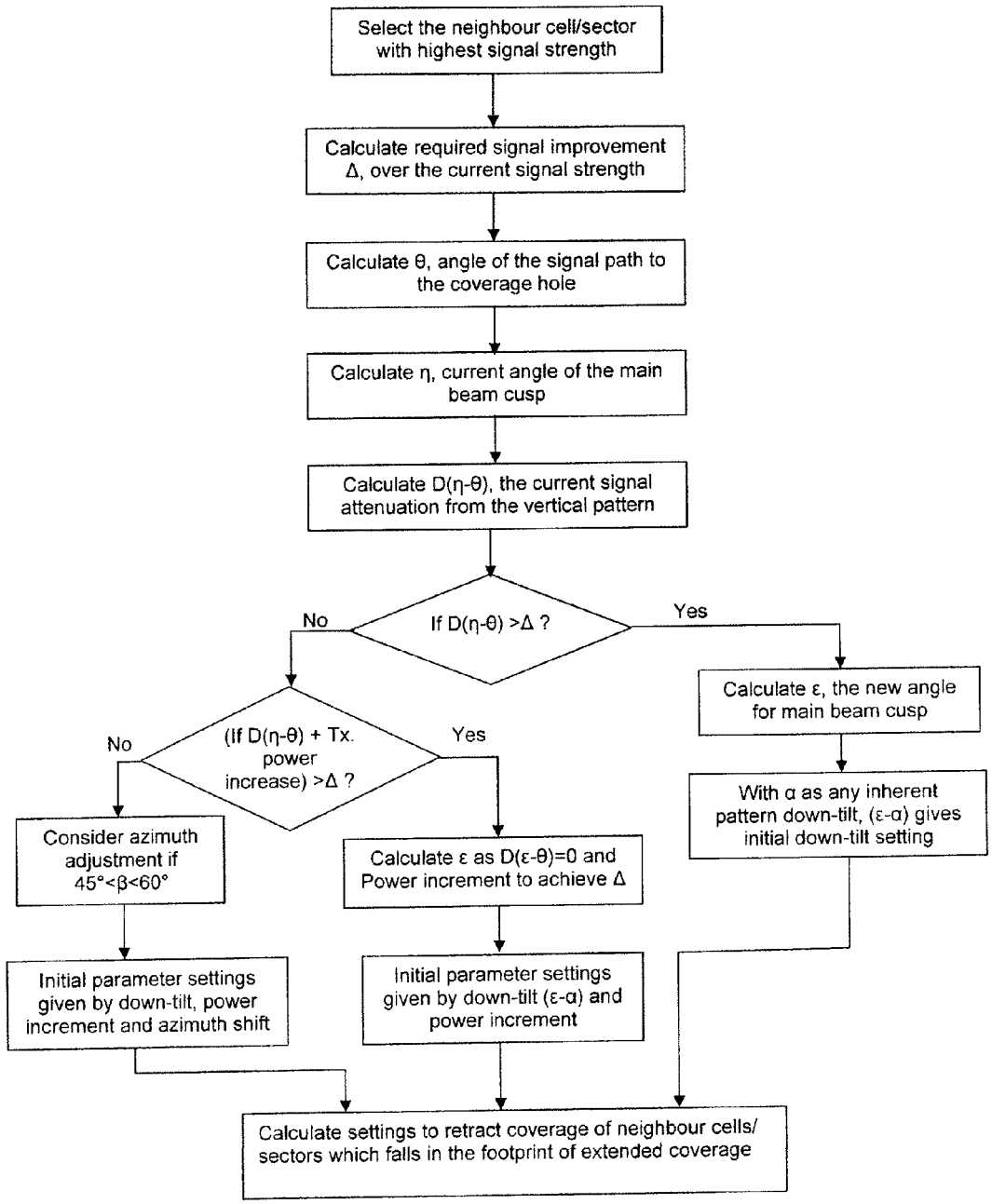
FIG. 4 is a flow chart for the initial parameter setting algorithm when reliable neighbour measurements are available in accordance with a first embodiment of the present invention.

FIG. 4 shows a flowchart describing the sequence of steps in accordance with the first embodiment of the present invention.

If the signal strength values of neighbouring cells available at the coverage hole location are not sufficiently reliable, in a second embodiment of the present invention the identification process finds which of the neighbouring cells fulfils the predetermined criterion of whether the maximum distance d at which the cell or cell sector can achieve a desired signal strength at the current transmission parameter settings of that cell or cell sector is greater than the distance $d_t$ between the coverage hole and that cell or cell sector, the cells or cell sectors in the group of neighbouring cells/sectors being considered in descending order of proximity to the coverage hole until a cell or cell sector which fulfils the predetermined criterion is found, or until all the cells or cell sectors have been considered. In this case the predetermined criterion is indicative of probable signal strength.

We will analyze the general case when the neighbour cell signal strength measurements are not reliable and only the distance to the coverage hole is known. The neighbour cell to be considered first is the one with the minimum distance to the coverage hole. As depicted in FIG. 2, the coverage hole exists at distant $d_t$ and angle β from the antenna bore-sight in the azimuth plane. The task is to calculate the antenna tilt θ which will extend the coverage of this cell and compensate for the coverage hole. For this we require the horizontal radiation pattern (on the azimuth plane) of the antenna as well. A typical azimuth pattern (for the same antenna as in FIG. 1) is shown in FIG. 3.

As the pattern shows, the antenna gain reduces as the horizontal angle β increases. The gain reduction (attenuation) at the specific β angle is calculated (denoted by $A_β$) and this is taken away from the maximum allowable path loss (MAPL). The MAPL is a standard calculation in the link budget and it is the difference between the Effective Isotropic Radiated Power (EIRP) and the receive sensitivity level of the mobile user after taking away all the related margins and adding relevant gains:

$$\text{MAPL}=\text{EIRP}-Rx\text{·Sensitivity}-\text{margins}+\text{gains} \tag{5}$$

with the EIRP defined as:

$$\text{EIRP}=\text{Transmit power}+\text{Antenna gain at bore-sight}-\text{cable losses} \tag{6}$$

So the allowable path loss at angle β becomes:

$$APL(\beta) = MAPL - A_\beta \quad (7)$$

where $A_\beta$ is the attenuation from the maximum gain, taken from the antenna data sheet (see for example FIG. 3).

The path loss model is then applied to APL(β), to obtain the maximum propagation distance at this angle β. A commonly-used path loss model is COST 231-HATA for example and if this model is used the path loss equation is:

$$APL(\beta) = 46.3 + 33.9*\log(f) - 13.82*\log(h_b) + (44.9 - 6.55*\log(h_b))*\log(d) - ahm + C_m \quad (8)$$

Here f is the carrier frequency in MHz, $h_b$ is the base antenna height in meters, d is the distance in km, ahm is a term related to mobile antenna height and $C_m$ is a clutter specific loss. At this point, all other terms are known except d, so d can be calculated. This distance d is the maximum distance that could be covered in this direction β, under the current transmit power and azimuth settings of the cell/sector under consideration.

It is then necessary to check if the coverage hole distance $d_t$ is lower than the maximum distance d. If $d_t < d$, the coverage hole can be compensated by down-tilt alone and the down-tilt is then calculated. If $d_t > d$, the coverage hole is too far out to be compensated by antenna down-tilt alone from the cell/sector under consideration, so the next closest cell/sector is analyzed in the same manner to determine if it can satisfy the condition $d_t < d$. If necessary, each cell/sector in the group of neighbouring cells/sectors is analyzed in the above manner in turn, in descending order of proximity to the coverage hole, to determine if any of them satisfy the condition $d_t < d$, until a cell/sector satisfying the condition can be identified or the list of neighbouring cells/sectors is exhausted.

If $d_t < d$ is satisfied by any of the candidate cells/sectors, the down-tilt calculation can be done as follows. As $d_t < d$, if the cusp of the main beam is projected towards the coverage hole, the coverage would extend beyond the coverage hole and cause excessive interference to other cells. Thus it is desirable to find the down-tilt angle that just covers the coverage hole, without extending further. For this, the cusp of the main beam should be pointed inside distance $d_t$, with the ray angle θ (FIG. 2) giving attenuation Δ from the maximum antenna gain. This attenuation (or back-off power) Δ can be found by considering the distance ratio $d_t/d$ as follows, assuming the COST 231-HATA path loss model:

$$\Delta = (44.9 - 6.55*\log(h_b))*\log(d_t/d) \quad (9)$$

For any other path loss model, the same can be calculated by relating the distance related term as above.

As the ratio $d_t/d < 1$, the attenuation will be given as a negative value. The magnitude of this value is matched to the attenuation of the vertical radiation pattern of FIG. 1. This attenuation should be achieved from the left side of the pattern (left of the main beam cusp) so that the cusp is pointed inwards, within the distance $d_t$. Assuming the angle giving this attenuation is δ, the cusp of the main beam should be an additional δ degrees down-tilted from the ray angle θ (in FIG. 2). The ray angle is given by the geometry of user position within the coverage hole. The total down-tilt angle is given by:

$$\text{down-tilt} = \theta + \delta \quad (10)$$
$$= \tan^{-1}((h_b - h_m - e)/d_t) + \delta$$

The difference in elevation e should be calculated as before in equation (2).

If $d_t < d$ cannot be satisfied by any of the candidate cells/sectors, the cell/sector in the group of neighbouring cells/sectors with the minimum ratio $d_t/d$ is selected to provide coverage hole compensation. As in equation (9), the distance-related term of the path loss model will give the additional power required to provide coverage to the coverage hole:

$$\Delta 1 = (44.9 - 6.55*\log(h_b))*\log(d_t/d) \quad (11)$$

Δ1 will give the additional gain required to cover the distance $d_t$. As $d_t > d$, Δ1 will be a positive value. If this gain can be achieved by increasing the transmit power of the cell/sector with minimum ratio $d_t/d$ within the power limits, for example up to 3-6 dB, then the coverage hole can be compensated by that cell/sector. In this case, the compensation steps will be:

i. Adjust the down-tilt such that the cusp of the main beam (vertical pattern) is pointing to the user at the coverage hole. The down-tilt angle θ will be given by:

$$\theta = \tan^{-1}((h_b - h_m - e)/d_t) - \text{any inherent down-tilt in the vertical radiation pattern} \quad (12)$$

ii. Increment the transmit power by Δ1 (of equation (11)).

If both down-tilt and transmit power increments are not sufficient to meet the required power increment Δ1, changing the azimuth bore-sight angle can be considered. In particular, as discussed above with reference to the first embodiment, if the additional required gain is within 5 dB and the azimuth angle β is within the range 45° to 60°, changing the bore-sight angle will be beneficial. The bore-sight angle should be changed by the relevant angle to achieve the additional required gain. This relevant angle is denoted by γ. If this is a 3-sectored layout, the bore-sight angle of the other two sectors should also be changed by the same angle so that the whole 3 sector pattern is rotated. Thus, in this case, the initial parameter settings include the changes to antenna tilt, transmit power and azimuth bore-sight direction.

As discussed with reference to the first embodiment, there may be some neighbouring cells/sectors which will be impacted by this extended coverage. The coverage of these neighbouring cells/sectors should be retracted to avoid interference. The basic settings for retracting the coverage should be calculated. These will consist of increased down-tilt, reduced transmit power and changes in the azimuth direction.

Figure 5:
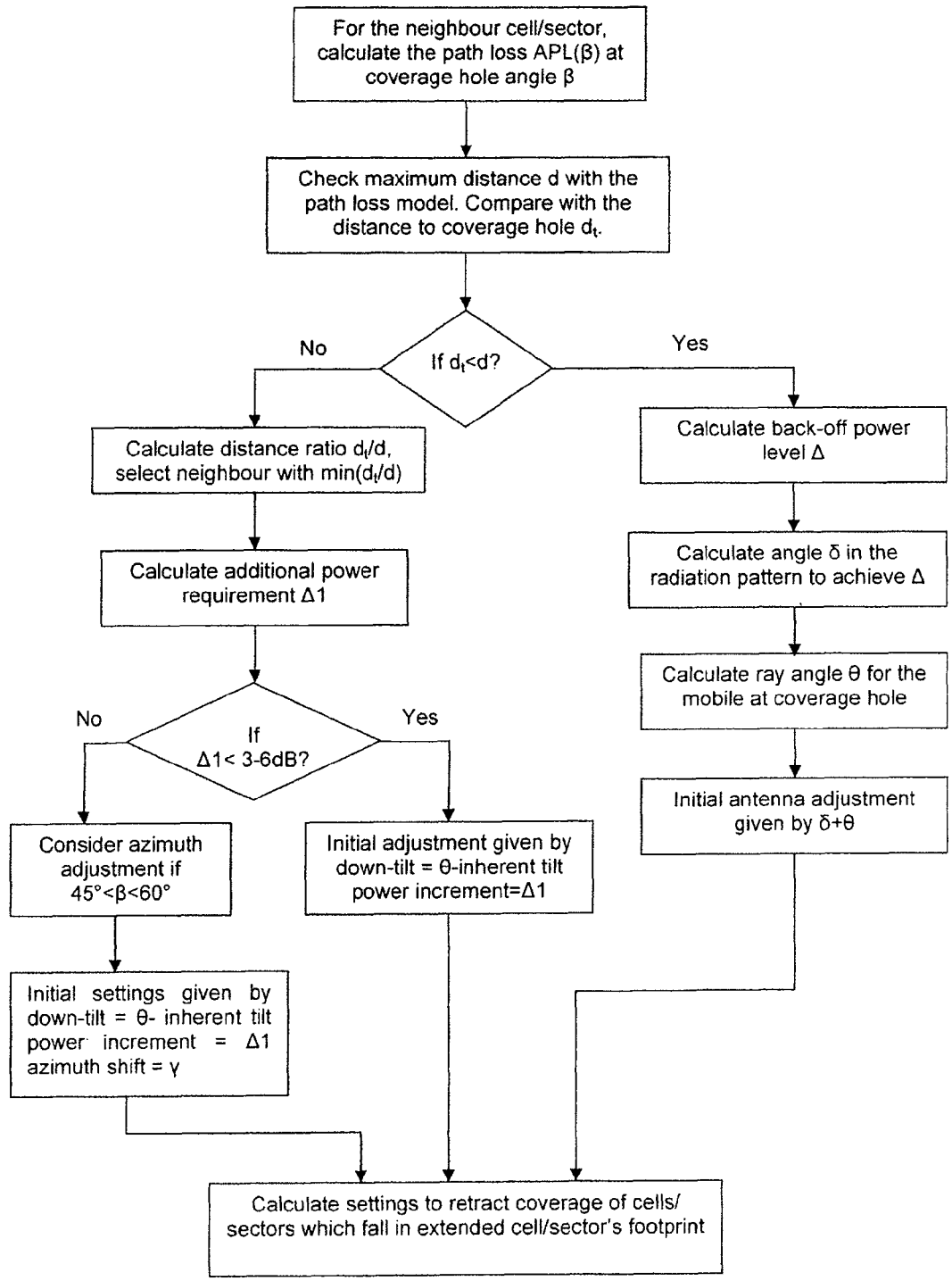
FIG. 5 is a flow chart for the initial parameter setting algorithm when reliable neighbour measurements are not available in accordance with a second embodiment of the present invention.

FIG. 5 shows a flow chart describing the sequence of steps in accordance with the second embodiment of the present invention.

Figure 6A:
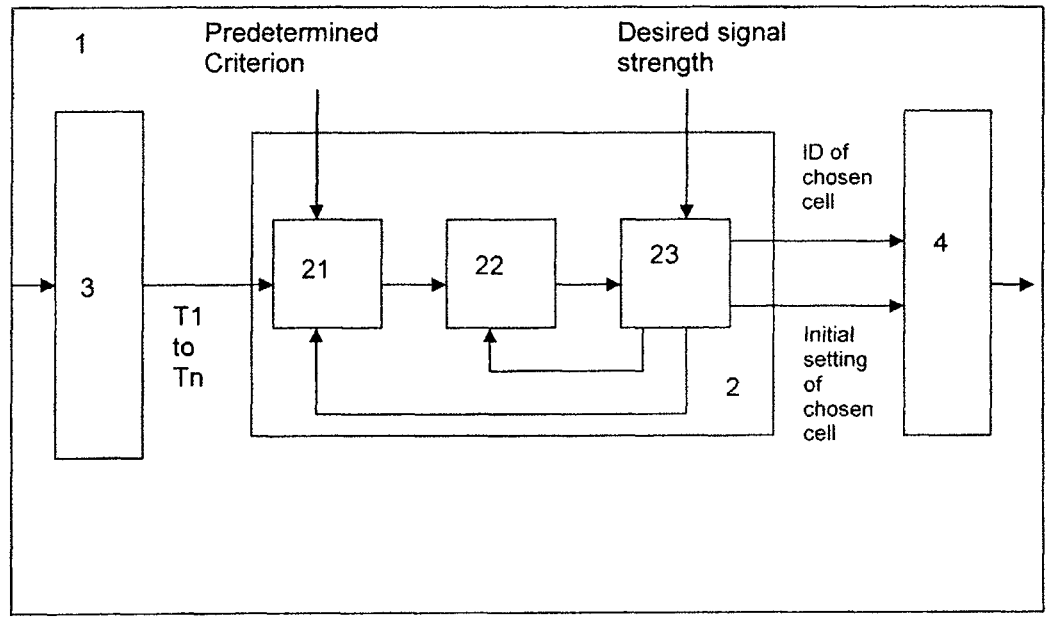
FIGS. 6a and 6b show respective apparatuses according to the first and second embodiments of the present invention.
Figure 6B:
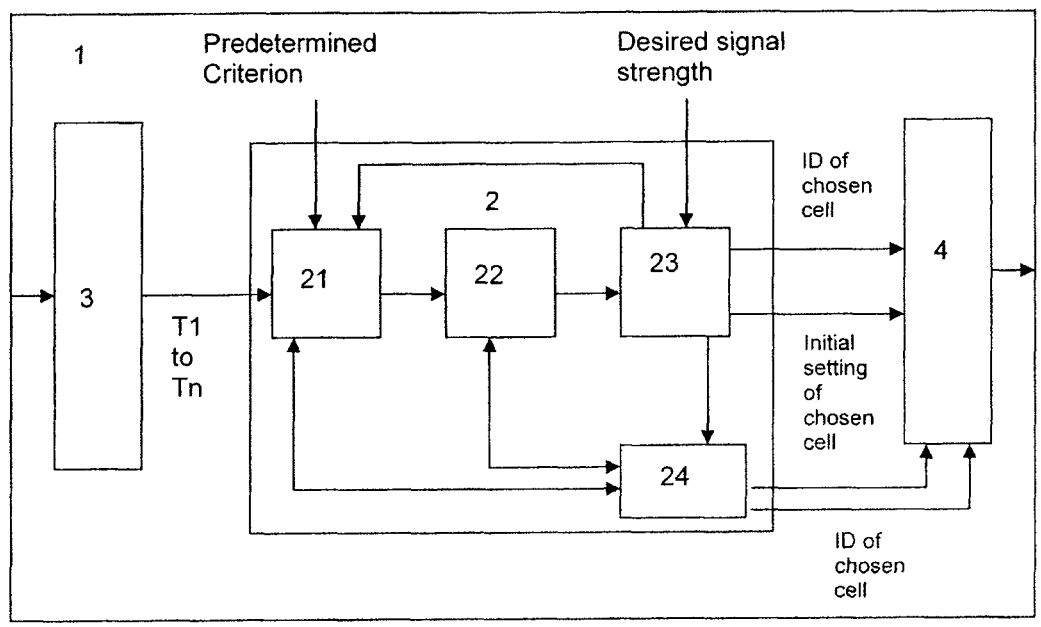

FIGS. 6a and 6b shows apparatus suitable for carrying out a method embodying the first and second embodiments of the present invention respectively. In each of FIGS. 6a and 6b the apparatus is provided in the base station 1 of the cell or cell sector having the coverage hole and comprises identification means 2, configured to carry out an identification process using data relating to a cell or cell sector in the group of cells neighbouring the cell or cell sector in which there is a coverage hole so as to identify a second cell or cell sector suitable for providing coverage, cell data supply means 3 for supplying the cell/cell sector data to the identification means 2, and output means 4 connected to receive from the identification means 2 data identifying the chosen second cell or cell sector and the initial setting of the chosen second cell/cell sector. The identification means 2 are operable to carry out an identification process on one or more cells or cell sectors in the said group in turn and comprise: first means 21 configured to receive, from the cell data supply means 3, transmission data readings T1 to Tn relating to n neighbouring cells, find a cell or cell sector in the group which best fulfils a predetermined criterion indicative of actual or probable signal strength of a signal from the cell or cell sector at the said coverage hole and output the identity of that cell/sector; second means 22 configured to receive the output of the first means 21, determine if a first transmission parameter setting for the cell or cell sector found to fulfil the predetermined criterion can be adjusted such that the radiation pattern of the cell or cell sector extends to the coverage hole, and, if so, output the adjusted parameter setting; and third means 23 configured to receive the adjusted parameter setting, determine whether at the adjusted parameter setting the cell or cell sector can provide coverage of a desired signal strength for at least part of the coverage hole in the first cell or cell sector, and, if so, provide an output to the output means 4 identifying the cell or cell sector as a cell or cell sector suitable for covering the coverage hole and indicating the adjustment required to the first transmission parameter setting in order to achieve it.

In the apparatus of FIG. 6a, which is configured for use in a method according to the first embodiment (i.e. where the signal strength readings at the coverage hole are reliable), if the third means 23 finds that adjustment of the first transmission parameter setting alone is not sufficient to provide the desired signal strength at the coverage hole, the third means 23 are operable to notify the second means 22 that the process should be repeated for the same cell/sector to determine whether adjustment of the second transmission parameter setting in addition to the first transmission parameter setting is sufficient to provide the desired signal strength at the coverage hole. If the third means 23 then finds that adjustment of the first and second transmission parameter settings is still not sufficient to provide the desired signal strength at the coverage hole, the third means 23 are operable to notify the second means 22 that the process should be repeated for the same cell/sector to determine whether adjustment of the third transmission parameter setting in addition to the first and second transmission parameter settings is sufficient to provide the desired signal strength at the coverage hole. If not, the third means 23 are operable to notify the first means 21 that the process should be repeated for the cell/sector in the group which next best fulfils the predetermined criterion. In this case the predetermined criterion is highest strength of signal from the cell or cell sector at the coverage hole, and the cells or cell sectors in the group are considered in descending order of signal strength.

In the apparatus of FIG. 6b, which is configured for use in a method according to the second embodiment (i.e. where the signal strength readings at the coverage hole are not reliable), the predetermined criterion is whether the maximum distance d at which the cell or cell sector can achieve a desired signal strength at the current transmission parameter settings of that cell or cell sector is greater than the distance $d_r$ between the coverage hole and that cell or cell sector, and the cells or cell sectors in the group are considered in descending order of proximity to the coverage hole. In this case, if the third means 23 finds that adjustment of the first transmission parameter setting alone is not sufficient to provide the desired signal strength at the coverage hole, the third means 23 are operable to notify the first means 21 that the process should be repeated in turn for the cell/sectors in the group which next best fulfil the predetermined criterion until a suitable cell/sector can be found or the list of candidate cells/sectors is exhausted.

If a cell meeting the predetermined criterion cannot be found, the third means 23 are operable to notify a fourth means 24 of the identification means 2 in FIG. 6b to obtain from the first means 21 the identity of the cell/sector in the group for which the ratio $d_r/d$ is a minimum and provide an output identifying that cell or cell sector as a cell or cell sector suitable for covering the coverage hole. The fourth means 24 is also operable to determine whether the first transmission parameter setting and a second transmission parameter setting for the selected cell/sector can be adjusted to settings for those parameters which are such that the cell/sector can provide coverage for at least part of the coverage hole, and, if so, provide an output indicating the required adjustments to the first and second transmission parameter settings for the selected cell/sector. If the first and second transmission parameter settings for the selected cell/sector cannot be adjusted to appropriate settings, the fourth means 24 are operable to determine whether a third transmission parameter setting can be adjusted to a setting for that parameter which is such that the selected cell/sector can provide coverage for at least part of the coverage hole, and, if so, provide an output to the output means 4 indicating the required adjustments to the first to third transmission parameter settings for the selected cell/sector.

The apparatus of FIGS. 6a and 6b has been described as being located in a base station, but the apparatus may be provided elsewhere. For example, in a SON the apparatus can be provided on the SON server or controller. Although the SON server can reside on one of the base stations, more preferably it is provided at a higher layer than the base stations, typically with the Operations and Maintenance entity (OAM) of the network.

Although described separately, each of the different embodiments of the invention may be combined with any other embodiment, as appropriate.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality described above.

The invention may also be embodied as one or more device or apparatus programs (e.g. computer programs and computer program products) for carrying out part or all of the methods described herein. Such programs embodying the present invention may be stored on computer-readable media, or could, for example, be in the form of one or more signals. Such signals may be data signals downloadable from an Internet website, or provided on a carrier signal, or in any other form.

The invention claimed is:

1. A method for use in providing coverage for at least part of a coverage hole in a first cell or cell sector of a cellular wireless network, in which method a second cell or cell sector is selected, from a group of cells or cell sectors of the cellular wireless network which neighbour the first cell or cell sector, to adapt its coverage so as to cover at least part of the coverage hole in the first cell or cell sector, the method comprising:

carrying out an identification process using data relating to a cell or cell sector in the said group to identify a cell or cell sector suitable for selection as the said second cell or cell sector, the identification process being carried out on one or more cells or cell sectors in the said group in turn, wherein the identification process comprises:

finding a cell or cell sector in the group which fulfils a predetermined criterion indicative of actual or probable signal strength of a signal from the cell or cell sector at the said coverage hole; and determining whether a first transmission parameter setting for the cell or cell sector found to fulfil the predetermined criterion can be adjusted such that the cell or cell sector can provide coverage for at least part of the coverage hole in the first cell or cell sector, and, when that is the case, identifying the cell or cell sector as a cell or cell sector suitable for selection as the said second cell, wherein, in a case where transmission data readings for the cells or cell sectors in the said group are reliable, then the said predetermined criterion is highest strength of signal from the cell or cell sector at the coverage hole, and the cells or cell sectors in the group are considered in descending order of signal strength.

2. A method as claimed in claim 1, wherein, when the first transmission parameter setting for the cell or cell sector cannot be adjusted such that the cell or cell sector can provide coverage for at least part of the coverage hole, the identification process further comprises:

determining whether a second transmission parameter setting for the cell or cell sector can be adjusted such that the cell or cell sector can provide coverage for at least part of the coverage hole in the first cell or cell sector, and, when that is the case, identifying the cell or cell sector as a cell or cell sector suitable for selection as the said second cell.

3. A method as claimed in claim 2, wherein, if the second transmission parameter setting for the cell or cell sector cannot be adjusted such that the cell or cell sector can provide coverage for at least part of the coverage hole, the identification process further comprises:

determining whether a third transmission parameter setting for the cell or cell sector can be adjusted such that the cell or cell sector can provide coverage for at least part of the coverage hole in the first cell or cell sector, and, when that is the case, identifying the cell or cell sector as a cell or cell sector suitable for selection as the said second cell.

4. A method as claimed in claim 3, wherein, when the first transmission parameter setting, or the first and second transmission parameter settings in combination, or the first, second and third transmission parameter settings in combination, as the case may be, for the cell or cell sector cannot be adjusted such that the cell or cell sector can provide coverage for at least part of the coverage hole, the identification process is repeated using cells or cell sectors in the group which have not yet been considered.

5. A method as claimed in claim 3, wherein, after selection of the second cell or cell sector, the method further comprises causing the first transmission parameter setting, or the first and second transmission parameter settings, or the first, second and third transmission parameter settings, as the case may be, for the selected second cell or cell sector to be adjusted appropriately.

6. A method as claimed in claim 3, wherein the said third transmission parameter setting is azimuth angle to the boresight of the antenna radiation pattern.

7. A method as claimed in claim 2, wherein the said second transmission parameter setting is antenna transmit power.

8. A method for use in providing coverage for at least part of a coverage hole in a first cell or cell sector of a cellular wireless network, in which method a second cell or cell sector is selected, from a group of cells or cell sectors of the cellular wireless network which neighbour the first cell or cell sector, to adapt its coverage so as to cover at least part of the coverage hole in the first cell or cell sector, the method comprising:

carrying out an identification process using data relating to a cell or cell sector in the said group to identify a cell or cell sector suitable for selection as the said second cell or cell sector, the identification process being carried out on one or more cells or cell sectors in the said group in turn, wherein the identification process comprises:

finding a cell or cell sector in the group which fulfils a predetermined criterion indicative of actual or probable signal strength of a signal from the cell or cell sector at the said coverage hole; and determining whether a first transmission parameter setting for the cell or cell sector found to fulfil the predetermined criterion can be adjusted such that the cell or cell sector can provide coverage for at least part of the coverage hole in the first cell or cell sector, and, when that is the case, identifying the cell or cell sector as a cell or cell sector suitable for selection as the said second cell, wherein, in a case where transmission data readings for the cells or cell sectors in the said group are not reliable, then the cells or cell sectors in the said group are considered in descending order of proximity to the coverage hole until a cell or cell sector which fulfils the predetermined criterion is found, or until all the cells or cell sectors have been considered, the predetermined criterion being whether a maximum distance d at which the cell or cell sector can achieve a desired signal strength at the current transmission parameter settings of that cell or cell sector is greater than a distance $d_r$ between the coverage hole and that cell or cell sector.

9. A method as claimed in claim 8, wherein, when the first transmission parameter setting for the cell or cell sector found to fulfil the predetermined criterion cannot be adjusted such that the cell or cell sector can provide coverage for at least part of the coverage hole, the identification process is repeated using cells or cell sectors in the group which have not yet been considered.

10. A method as claimed in claim 9, wherein, when none of the cells or cells sectors in the said group is found to fulfil the said predetermined criterion, the method further comprises:

finding the cell or cell sector in the said group for which a ratio $d_r/d$ is a minimum and selecting that cell or cell sector as the said second cell or cell sector.

11. A method as claimed in claim 10, wherein, after selection of the second cell or cell sector for which the ratio $d_r/d$ is a minimum, the method further comprises determining whether the first transmission parameter setting and a second transmission parameter setting for the selected second cell or cell sector in combination can be adjusted such that the said second cell or cell sector can provide coverage for at least part of the coverage hole in the first cell or cell sector, and, when that is the case, causing the first and second transmission parameter settings for the selected second cell or cell sector to be adjusted appropriately.

12. A method as claimed in claim 11, wherein, when adjustment of the first and second transmission parameter settings for the selected second cell or cell sector is not sufficient for the selected cell or cell sector to provide coverage for at least part of the coverage hole, the method further comprises determining whether the first and second transmission parameter settings and a third transmission parameter setting in combination can be adjusted to a desired setting for that parameter which is such that the said second cell or cell sector can provide coverage for at least part of the coverage hole in the first cell or cell sector, and, when that is the case, causing the first, second and third transmission parameter settings for the selected second cell or cell sector to be adjusted appropriately.

13. Apparatus for use in a cellular wireless network, which apparatus is operable to assist in providing coverage for at least part of a coverage hole in a first cell or cell sector of the cellular wireless network by selecting a second cell or cell sector, from a group of cells or cell sectors of the cellular wireless network which neighbour the first cell or cell sector, to adapt its coverage so as to cover at least part of the coverage hole in the first cell or cell sector, the apparatus comprising:

identification means configured to carry out an identification process using data relating to a cell or cell sector in the said group to identify a cell or cell sector suitable for selection as the said second cell or cell sector, the identification means being operable to carry out an identification process on one or more cells or cell sectors in the said group in turn, wherein the identification process comprises:

finding a cell or cell sector in the group which fulfils a predetermined criterion indicative of actual or probable signal strength of a signal from the cell or cell sector at the said coverage hole; and determining whether a first transmission parameter setting for the cell or cell sector found to fulfil the predetermined criterion can be adjusted such that the cell or cell sector can provide coverage for at least part of the coverage hole in the first cell or cell sector, and, when that is the case, identifying the cell or cell sector as a cell or cell sector suitable for selection as the said second cell, wherein, in a case where transmission data readings for the cells or cell sectors in the said group are reliable, then the said predetermined criterion is highest strength of signal from the cell or cell sector at the coverage hole, and the identification means are operable to consider the cells or cell sectors in the group in descending order of signal strength.

14. Apparatus as claimed in claim 13, wherein, when the identification means determines that the first transmission parameter setting for the cell or cell sector cannot be adjusted such that the cell or cell sector can provide coverage for at least part of the coverage hole, the identification process carried out by the identification means further comprises:

determining whether a second transmission parameter setting for the cell or cell sector can be adjusted such that the cell or cell sector can provide coverage for at least part of the coverage hole in the first cell or cell sector, and, when that is the case, identifying the cell or cell sector as a cell or cell sector suitable for selection as the said second cell.

15. Apparatus as claimed in claim 14, wherein, when the identification means determine that the second transmission parameter setting for the cell or cell sector cannot be adjusted such that the cell or cell sector can provide coverage for at least part of the coverage hole, the identification process carried out by the identification means further comprises:

determining whether a third transmission parameter setting for the cell or cell sector can be adjusted such that the cell or cell sector can provide coverage for at least part of the coverage hole in the first cell or cell sector, and, when that is the case, identifying the cell or cell sector as a cell or cell sector suitable for selection as the said second cell.

16. Apparatus as claimed in claim 15, wherein, when the identification means determine that the first transmission parameter setting, or the first and second transmission parameter settings in combination, or the first, second and third transmission parameter settings in combination, as the case may be, for the cell or cell sector cannot be adjusted such that the cell or cell sector can provide coverage for at least part of the coverage hole, the identification means is operable to repeat the identification process using cells or cell sectors in the group which have not yet been considered.

17. Apparatus as claimed in claim 15, wherein the apparatus is operable, after selection of the second cell or cell sector, to cause the first transmission parameter setting, or the first and second transmission parameter settings, or the first, second and third transmission parameter settings, as the case may be, for the selected second cell or cell sector to be adjusted appropriately.

18. Apparatus as claimed in claim 15, wherein the said third transmission parameter setting is azimuth angle to the boresight of the antenna radiation pattern.

19. Apparatus as claimed in claim 14, wherein the said second transmission parameter setting is antenna transmit power.

20. Apparatus for use in a cellular wireless network, which apparatus is operable to assist in providing coverage for at least part of a coverage hole in a first cell or cell sector of the cellular wireless network by selecting a second cell or cell sector, from a group of cells or cell sectors of the cellular wireless network which neighbour the first cell or cell sector, to adapt its coverage so as to cover at least part of the coverage hole in the first cell or cell sector, the apparatus comprising:

identification means configured to carry out an identification process using data relating to a cell or cell sector in the said group to identify a cell or cell sector suitable for selection as the said second cell or cell sector, the identification means being operable to carry out an identification process on one or more cells or cell sectors in the said group in turn, wherein the identification process comprises:

finding a cell or cell sector in the group which fulfils a predetermined criterion indicative of actual or probable signal strength of a signal from the cell or cell sector at the said coverage hole; and determining whether a first transmission parameter setting for the cell or cell sector found to fulfil the predetermined criterion can be adjusted such that the cell or cell sector can provide coverage for at least part of the coverage hole in the first cell or cell sector, and, when that is the case, identifying the cell or cell sector as a cell or cell sector suitable for selection as the said second cell, wherein, in a case where transmission data readings for the cells or cell sectors in the said group are not reliable, then the identification means are operable to consider the cells or cell sectors in the said group in descending order of proximity to the coverage hole until a cell or cell sector which fulfils the predetermined criterion is found, or until all the cells or cell sectors have been considered, the predetermined criterion being whether a maximum distance d at which the cell or cell sector can achieve a desired signal strength at the current transmission parameter settings of that cell or cell sector is greater than a distance $d_t$ between the coverage hole and that cell or cell sector.

21. Apparatus as claimed in claim 20, wherein, when the identification means determine that the first transmission parameter setting for the cell or cell sector found to fulfil the predetermined criterion cannot be adjusted such that the cell or cell sector can provide coverage for at least part of the coverage hole, the identification means is operable to repeat the identification process using cells or cell sectors in the group which have not yet been considered.

22. Apparatus as claimed in claim 21, wherein, when none of the cells or cells sectors in the said group is found to fulfil the said predetermined criterion, the apparatus is operable to find the cell or cell sector in the said group for which the ratio $d_t/d$ is a minimum and to select that cell or cell sector as the said second cell or cell sector.

23. Apparatus as claimed in claim 22, wherein the apparatus is operable, after selection of the second cell or cell sector for which the ratio $d_t/d$ is a minimum, to determine whether the first transmission parameter setting and a second transmission parameter setting for the selected second cell or cell sector in combination can be adjusted such that the said second cell or cell sector can provide coverage for at least part of the coverage hole in the first cell or cell sector, and, when that is the case, to cause the first and second transmission parameter settings for the selected second cell or cell sector to be adjusted appropriately.

24. Apparatus as claimed in claim 23, wherein, when adjustment of the first and second transmission parameter settings for the selected second cell or cell sector is not sufficient for the selected cell or cell sector to provide coverage for at least part of the coverage hole, the apparatus is operable to determine whether the first and second transmission parameter settings and a third transmission parameter setting in combination can be adjusted such that the said second cell or cell sector can provide coverage for at least part of the coverage hole in the first cell or cell sector, and, when that is the case, to cause the first, second and third transmission parameter settings for the selected second cell or cell sector to be adjusted appropriately.

* * * * *